US009509614B2

(12) United States Patent
Bosch et al.

(10) Patent No.: US 9,509,614 B2
(45) Date of Patent: Nov. 29, 2016

(54) HIERARCHICAL LOAD BALANCING IN A NETWORK ENVIRONMENT

(71) Applicant: CISCO TECHNOLOGY, INC., San Jose, CA (US)

(72) Inventors: Hendrikus G. P. Bosch, Aalsmeer (NL); David Richard Barach, Mount Dora, FL (US); Michael E. Lipman, Harvard, MA (US); Alessandro Duminuco, Vibonati (IT); James N. Guichard, New Boston, NH (US); Humberto J. La Roche, Ocean, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 689 days.

(21) Appl. No.: 13/923,257

(22) Filed: Jun. 20, 2013

(65) Prior Publication Data

US 2014/0379938 A1 Dec. 25, 2014

(51) Int. Cl.
*H04L 12/803* (2013.01)

(52) U.S. Cl.
CPC .................................. *H04L 47/125* (2013.01)

(58) Field of Classification Search
CPC ............ H04L 47/125; H04L 67/1002; H04L 67/1038; H04L 67/1027; H04L 67/1004; G06F 2206/1012; G06F 9/5083
See application file for complete search history.

(56) References Cited

U.S. PATENT DOCUMENTS

| 6,167,438 | A | 12/2000 | Yates et al. |
| 6,996,822 | B1 * | 2/2006 | Willen .................. G06F 9/5083 711/100 |
| 7,197,660 | B1 | 3/2007 | Liu et al. |
| 7,209,435 | B1 | 4/2007 | Kuo et al. |
| 7,231,462 | B2 | 6/2007 | Berthaud et al. |
| 7,558,261 | B2 | 7/2009 | Arregoces et al. |

(Continued)

FOREIGN PATENT DOCUMENTS

| CN | 101427525 A | 5/2009 |
| CN | 104011687 A | 8/2014 |

(Continued)

OTHER PUBLICATIONS

U.S. Appl. No. 14/108,994, filed Dec. 17, 2013, entitled "Method for Implicit Session Routing," Inventors: Hendrikus G.P. Bosch, et al.

(Continued)

*Primary Examiner* — Chris Parry
*Assistant Examiner* — Stephen Houlihan
(74) *Attorney, Agent, or Firm* — Patent Capital Group

(57) ABSTRACT

An example method for load balancing in a network environment is provided and includes receiving a packet from a first stage load-balancer in a network environment, where the packet is forwarded from the first stage load-balancer to one of a plurality of second stage load-balancers in the network according to a hash based forwarding scheme, and routing the packet from the second stage load-balancer to one of a plurality of servers in the network according to a per-session routing scheme. The per-session routing scheme includes retrieving a session routing state from a distributed hash table in the network. In a specific embodiment, the hash based forwarding scheme includes equal cost multi path routing. The session routing state can include an association between a next hop for the packet and the packet's 5-tuple representing a session to which the packet belongs.

20 Claims, 9 Drawing Sheets

(56) References Cited

U.S. PATENT DOCUMENTS

| | | | |
|---|---|---|---|
| 7,567,504 B2 | 7/2009 | Darling et al. | |
| 7,571,470 B2 | 8/2009 | Arregoces et al. | |
| 7,610,375 B2 | 10/2009 | Portolani et al. | |
| 7,643,468 B1 | 1/2010 | Arregoces et al. | |
| 7,647,422 B2 | 1/2010 | Singh et al. | |
| 7,657,940 B2 | 2/2010 | Portolani et al. | |
| 7,668,116 B2 | 2/2010 | Wijnands et al. | |
| 7,860,095 B2 | 12/2010 | Forissier et al. | |
| 7,990,847 B1 | 8/2011 | Leroy et al. | |
| 8,291,180 B2 | 10/2012 | Austruy et al. | |
| 8,311,045 B2 | 11/2012 | Quinn et al. | |
| 8,442,043 B2 | 5/2013 | Sharma et al. | |
| 8,700,801 B2 | 4/2014 | Medved | |
| 8,762,534 B1 | 6/2014 | Hong et al. | |
| 8,904,037 B2 | 12/2014 | Haggar et al. | |
| 8,954,491 B1 | 2/2015 | Medved | |
| 9,015,299 B1 | 4/2015 | Shah | |
| 9,088,584 B2 | 7/2015 | Feng et al. | |
| 9,374,297 B2 | 6/2016 | Bosch et al. | |
| 2001/0023442 A1 | 9/2001 | Masters | |
| 2002/0131362 A1 | 9/2002 | Callon | |
| 2002/0150094 A1 | 10/2002 | Cheng | |
| 2003/0088698 A1 | 5/2003 | Singh et al. | |
| 2003/0120816 A1 | 6/2003 | Berthaud et al. | |
| 2004/0120355 A1 | 6/2004 | Kwiatkowski | |
| 2004/0255048 A1* | 12/2004 | Lev Ran | G06F 9/546 709/249 |
| 2004/0264481 A1 | 12/2004 | Darling et al. | |
| 2004/0268357 A1 | 12/2004 | Joy et al. | |
| 2005/0257002 A1 | 11/2005 | Nguyen | |
| 2005/0289244 A1 | 12/2005 | Sahu | |
| 2006/0092950 A1 | 5/2006 | Arregoces et al. | |
| 2006/0095960 A1 | 5/2006 | Arregoces et al. | |
| 2006/0233106 A1 | 10/2006 | Achlioptas et al. | |
| 2006/0233155 A1 | 10/2006 | Srivastava | |
| 2006/0291446 A1 | 12/2006 | Caldwell | |
| 2007/0011740 A1* | 1/2007 | Davis | H04L 63/0227 726/22 |
| 2007/0058568 A1 | 3/2007 | Previdi | |
| 2007/0250836 A1 | 10/2007 | Li et al. | |
| 2008/0177896 A1 | 7/2008 | Quinn et al. | |
| 2008/0181103 A1* | 7/2008 | Davies | H04L 47/125 370/230 |
| 2008/0225710 A1 | 9/2008 | Raja et al. | |
| 2009/0279536 A1 | 11/2009 | Unbehagen | |
| 2009/0300407 A1 | 12/2009 | Kamath et al. | |
| 2009/0328054 A1 | 12/2009 | Paramasivam et al. | |
| 2010/0080222 A1 | 4/2010 | Mohapatra | |
| 2010/0165985 A1 | 7/2010 | Sharma et al. | |
| 2010/0322250 A1* | 12/2010 | Shetty | H04L 41/50 370/395.32 |
| 2011/0128888 A1 | 6/2011 | Buob | |
| 2011/0271007 A1 | 11/2011 | Wang | |
| 2012/0030365 A1 | 2/2012 | Lidstrom et al. | |
| 2012/0051221 A1 | 3/2012 | Bui | |
| 2012/0144066 A1 | 6/2012 | Medved | |
| 2012/0158976 A1 | 6/2012 | Van Der Merwe | |
| 2012/0213218 A1 | 8/2012 | Yilmaz | |
| 2012/0224536 A1 | 9/2012 | Hahn | |
| 2012/0290716 A1 | 11/2012 | Ogielski | |
| 2012/0307825 A1 | 12/2012 | Hui | |
| 2012/0314618 A1 | 12/2012 | Ben-Houidi | |
| 2013/0028140 A1 | 1/2013 | Hui | |
| 2013/0031271 A1 | 1/2013 | Bosch | |
| 2013/0041982 A1 | 2/2013 | Shi | |
| 2013/0097323 A1 | 4/2013 | Barsness et al. | |
| 2013/0163594 A1 | 6/2013 | Sharma et al. | |
| 2013/0191688 A1 | 7/2013 | Agarwal | |
| 2013/0198412 A1 | 8/2013 | Saito | |
| 2013/0201909 A1 | 8/2013 | Bosch | |
| 2013/0219046 A1 | 8/2013 | Wetterwald | |
| 2013/0272305 A1 | 10/2013 | Lefebvre | |
| 2013/0279503 A1 | 10/2013 | Chiabaut | |
| 2014/0188676 A1 | 7/2014 | Marmolejo-Meillon et al. | |
| 2014/0258496 A1* | 9/2014 | Wu | H04L 67/1002 709/223 |
| 2014/0304412 A1 | 10/2014 | Prakash et al. | |
| 2014/0307744 A1 | 10/2014 | Dunbar | |
| 2014/0310391 A1* | 10/2014 | Sorenson, III | H04L 45/24 709/223 |
| 2014/0351452 A1 | 11/2014 | Bosch et al. | |
| 2014/0376371 A1 | 12/2014 | Flinck | |
| 2015/0172170 A1 | 6/2015 | Bosch et al. | |

FOREIGN PATENT DOCUMENTS

| | | |
|---|---|---|
| EP | 2791802 | 6/2013 |
| WO | WO2005/104650 | 11/2005 |
| WO | WO2013/090035 | 6/2013 |
| WO | WO 2014/189670 | 11/2014 |
| WO | WO2015/094567 | 6/2015 |

OTHER PUBLICATIONS

PCT Jun. 26, 2014 International Preliminary Report on Patentability from International Application PCT/US2012/067502.

USPTO Jul. 10, 2014 Non-Final Office Action from U.S. Appl. No. 13/329,023.

USPTO Nov. 5, 2014 Notice of Allowance from U.S. Appl. No. 13/329,023.

Fernando et al., "Virtual Topologies for Service Chaining in BGP IP VPNs; draft-rfernando-l3vpn-service-chaining-01," Internet Engineering Task Force, Feb. 25, 2013; 16 pages.

Fang et al., "BGP IP BPN Virtual PE; draft-fang-l3vpn-virtual-pe-02," Internet Engineering Task Force, Apr. 7, 2013; 26 pages.

PCT Nov. 10, 2014 International Search Report from International Application No. PCT/US2014/036907; 3 pages.

Rosen et al., "BGP/MPLS IP Virtual Private Networks (VPNs)," Network Working Group, RFC 4364, Feb. 2006; 47 pages.

Mackie, B., et al., "Service Function Chains Using Virtual Networking," draft-mackie-sfc-using-virtual-networking-o2.txt; Internet Engineering Tas Force, IETF Standard Working Draft, Oct. 17, 2013; 44 pages.

PCT Mar. 16, 2015 International Search Report and Written Opinion from International Application No. PCT/US2014/066629.

USPTO Mar. 25, 2015 Notice of Allowance from U.S. Appl. No. 13/329,023.

USPTO Apr. 28, 2015 Non-Final Office Action from U.S. Appl. No. 14/108,994.

Bitar, et al., "Interface to the Routing System (I2RS) for Service Chaining: Use Cases and Requirements," draft-bitar-i2rs-service-chaining-00.txt; Internet Engineering Task Force, IETF Standard Working Draft; Ju. 15, 2013; 30 pages.

PCT-Apr. 4, 2013 International Search Report and Written Opinion from International Application No. PCT/US2012/067502 11 pages.

IP infusion™, "A Redundant Architecture for Routing Protocols," White Paper, Jun. 2002, XP002240009, 8 pages; www.ipinfusion.com/pdf/WP_Redundancy_rev0602.pdf.

PCT-Jun. 30, 2008 International Search Report and Written Opinion from International Application No. PCT/IB05/01013, 5 pages.

PCT Mar. 10, 2009 International Preliminary Report on Patentability from International Application No. PCT/IB05/01013, 5 pages.

Bosch, et al., "Telco Clouds and Virtual Telco: Consolidation, Convergence, and Beyond", May 23-27, 2011, Proceedings of 2011 IFIP/IEEE International Symposium on Integrated Network Management (IM), Dublin, 7 pages.

Kim, et al., "Floodless in Seattle: A Scalable Ethernet Architecture for Large Enterprises," Computer Communication Review, Oct. 2008, 14 pages; http://www.cs.princeton.edu/~chkim/Research/SEATTLE/seattle.pdf.

Rescorla, "Introduction to Distributed Hash Tables," Proceedings of the sixty-seventh Internet Engineering Task Force, IAB Plenary, Nov. 5-10, 2006, San Diego, CA, 39 pages; http://www.ietf.org/proceedings/65/slides/plenaryt-2.pdf.

Wu, et al., "Resilient and efficient load balancing in distributed hash tables," Journal of Network and Computer Applications 32 (2009), 16 pages; http://sist.sysu.edu.cn/~dwu/papers/jnca09-lb.pdf.

(56) References Cited

OTHER PUBLICATIONS

Lampson, "How to Build a Highly Available System Using Consensus," Proceedings of the 10th International Workshop on Distributed Algorithms (1996), 17 pages; http://research.microsoft.com/en-us/people/blampson/58-Consensus/Acrobat.pdf.

Gray, et al., "Leases: An Efficient Fault-Tolerant Mechanism for Distributed File Cache Consistency," Proceedings of the twelfth ACM symposium on Operating systems principles, New York, NY (1989), 9 pages; http://www.stanford.edu/class/cs240/readings/89-leases.pdf.

Jeff Pang, Distributed Hash Tables<2004, 33 pages; http://www.cs.cmu.edu/~dga/15-744/S07/lectures/16-dht.pdf.

USPTO Nov. 4, 2015 Final Office Action from U.S. Appl. No. 14/108,994.

U.S. Appl. No. 13/329,023, filed Dec. 16, 2011, entitled "System and Method for Non-Disruptive Management of Servers in a Network Environment," Inventors: Chao Feng, et al.

PCT Jun. 21, 2016 International Preliminary Report on Patentability from International Application No. PCT/US2014/066629; 9 pages.

PRC May 30, 2016 SIPO $1^{st}$ Office Action from Chinese Application Serial No. CN2012861940; 22 pages.

USPTO Feb. 25, 2016 Non-Final Office Action from U.S. Appl. No. 13/898,932.

USPTO Jul. 19, 2016 Final Office Action from U.S. Appl. No. 13/898,932.

\* cited by examiner

| SESSION TABLE 48 | | | | | | |
|---|---|---|---|---|---|---|
| SRC IP | SRC PORT | DEST IP | DEST PORT | PROTOCOL | NEXT HOP | AFFINITY LB |
| | | | | | | |
| 52 | 54 | 56 | 58 | 60 | 50 | 68 |

HIERARCHICAL LOAD BALANCING IN A NETWORK ENVIRONMENT

TECHNICAL FIELD

This disclosure relates in general to the field of communications and, more particularly, to hierarchical load balancing in a network environment.

BACKGROUND

A mobile network is a radio network distributed over land areas called cells, each served by at least one fixed-location transceiver, known as a cell site or base station. As the number of mobile devices increase, mobile networks are edging near capacity in terms of bandwidth utilization with a potential threat to price, and performance. As mobile broadband traffic increases, mobile service providers seek new ways to lower the cost of operating their networks and deliver innovative revenue-generating services to their subscribers to meet the twin challenges of optimizing and monetizing their networks. To this end, mobile service providers seek increasing bandwidth by using newer 3G+/4G technologies, with shrinking cell sizes and Wireless Fidelity (Wi-Fi) networks. To monetize traffic through their networks, mobile service providers seek to provide network infrastructure and services such as firewalls, content filters, ad-insertion, video optimization, and header enrichment on a per-subscriber basis.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for load balancing in a network environment is provided and includes receiving a packet (e.g., from a first stage load-balancer in a network environment), where the packet is forwarded (i.e., sent, communicated, or transmitted) from the first stage load-balancer to one of a plurality of second stage load-balancers in the network according to a hash based forwarding scheme, and routing (i.e., sent, communicated, forwarded, or transmitted) the packet from the second stage load-balancer to one of a plurality of servers in the network according to a per-session routing scheme. The per-session routing scheme includes retrieving a session routing state from a distributed hash table in the network. In a specific embodiment, the hash based forwarding scheme includes equal cost multi path routing. The session routing state can include an association between a next hop for the packet and the packet's 5-tuple representing a session to which the packet belongs.

Example Embodiments

Figure 1:
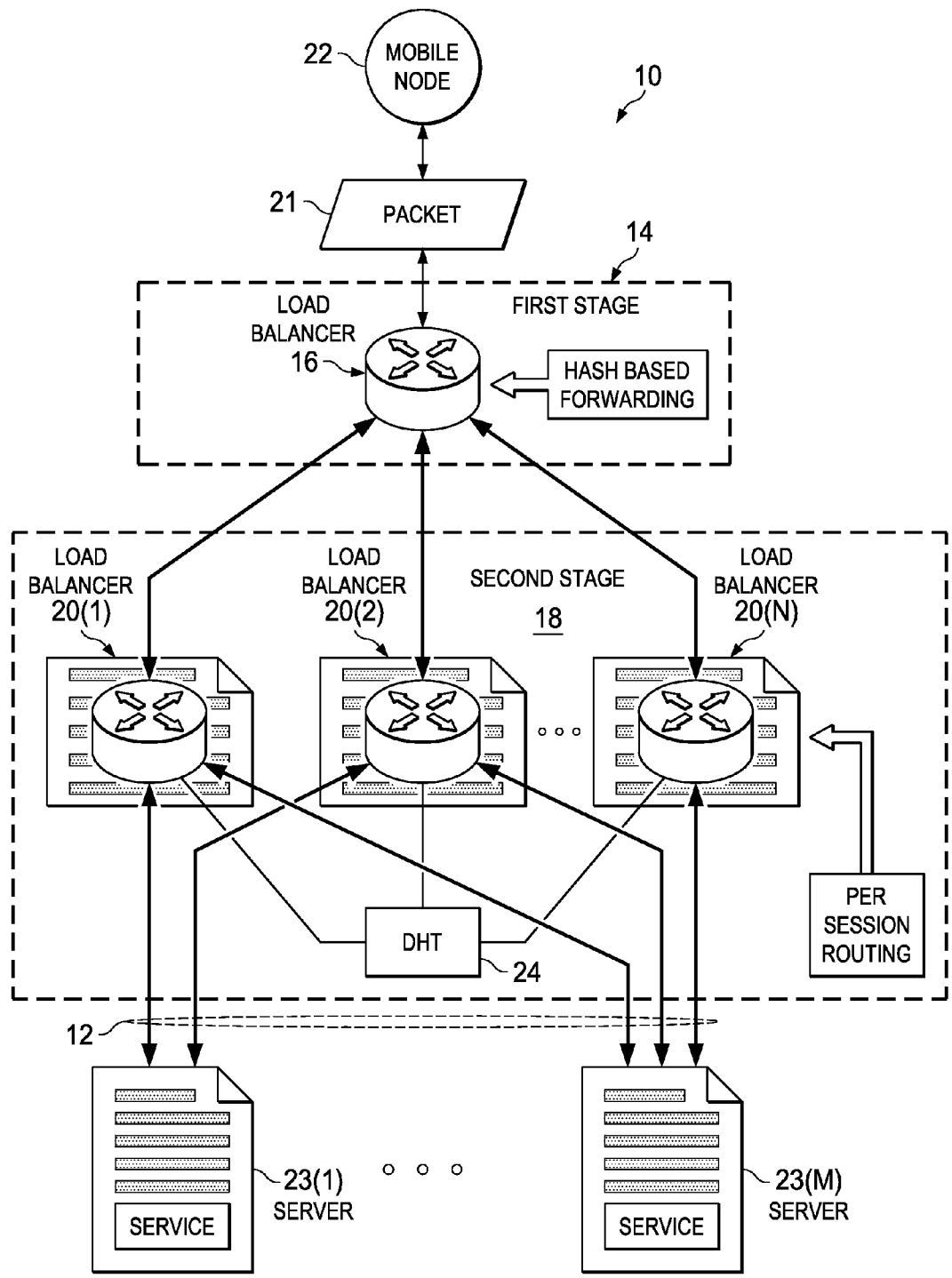
FIG. 1 is a simplified block diagram illustrating a communication system to facilitate hierarchical load balancing in a network environment according to an example embodiment.

Turning to FIG. 1, FIG. 1 is a simplified block diagram illustrating an embodiment of communication system 10 for facilitating hierarchical load balancing in a network environment. Communication system 10 includes a network 12, which may comprise a first stage 14 including a plurality of load-balancers (referred to herein as first stage load-balancers) such as first stage load-balancer 16, and a second stage 18 including another plurality of load-balancers (referred to herein as the second stage load-balancers) 20(1)-20(N). According to various embodiments, a packet 21 from a mobile node 22 destined to one of servers 23(1)-23(M), for example, server 23(1), may be forwarded by first stage load-balancer 16 to second stage load-balancer 20(1) according to a hash based forwarding scheme; packet 21 may be forwarded from second stage load-balancer 20(1) to server 23(1) according to per-session routing schemes using a distributed hash table 24.

As used herein, the term "load-balancer" refers to a router, a switch, or a dedicated service appliance that acts as a reverse proxy and distributes network or application traffic across a number of servers. The term "server" includes a software program (e.g., a virtual appliance, virtual machine, etc.), or the computer on which that program executes, that provides a specific kind of service to client software executing on the same computer or on other computers communicating over a network (e.g., network 12). Computers can include any device capable of performing binary and logical computing, including mobile smart phones, desktop computers, laptop computers, tablet computers, and associated processors. The term "mobile node" may include any mobile electronic device (e.g., cellular phone), client, server, peer, service, application, or other mobile (e.g., non-stationary) object capable of sending, receiving, or forwarding information over communications channels in a network.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

A mobile service provider typically monetizes its mobile network by way of providing services on per session (e.g. Transmission Control Protocol (TCP) session, User Datagram Protocol (UDP) session, etc.) and/or per application (e.g., hyper-text transfer protocol (HTTP), video, voice, Instant Messaging Service (IMS), etc.) basis. For example, if a mobile subscriber accesses a bandwidth consuming web-site (e.g. YouTube™) and the mobile service provider deduces that the cell the mobile node is connected to is overloaded, the mobile service provider may charge the request differently, may compress the video stream more extensively, or may even deny the request altogether. In another example, the mobile service provider may include in-line services such as specific TCP optimizations and other network functions that operate on a per-session basis for certain network services such as cellular wireless channels, Secure Socket Layer/Transport Layer Security (SSL/TLS) specific session routing, web-caching operations, etc. The in-line services are typically deployed within a call flow, as opposed to requiring the call to be off-loaded to application servers.

Traditionally, deploying in-line services in a mobile packet core is typically based on a combination of physical network elements that are cobbled together to provide an overall service solution. Alternatively, some services are embedded in traditional packet gateways, but such solutions have various performance constraints. The major downside of traditional approaches is that usually such solutions are over-or under-dimensioned ad-hoc hardware based solutions with cumbersome management.

The mobile service provider may want to provision just sufficient amount of resources to operate the in-line services to save operational and capital expenses. For example, the in-line services may be provided through virtual appliances in data centers to avoid the capital expenditure for equipment to support maximum expected capacity. The mobile service provider can contract more resources if demand picks up for one, more or all services, and dismiss resources when demand falls. In addition, with most of the in-line services maintaining a large amount of per-session state information, the number of sessions originating from the mobile service provider's subscribers can be substantial.

Traditional routers cannot meet the memory and processor capacity requirements from session-routing functions of in-line services, for example, because there is not sufficient capacity to maintain and process all the data structures needed for individual session routing tables. A large mobile service provider may need to maintain 10-100M or more mobile nodes, each easily creating tens of individual sessions in short time frames. Typically, the mobile service provider aggregates all its mobile traffic and services (e.g., from the whole or major part of its coverage area) at a few locations. This implies that aggregate traffic may surpass 100 Gb/s, which can surpass (potentially by far) the forwarding, routing and session handling capacity of any one application-specific session router operating on a regular processor. Moreover, the number of mobile subscribers may range up to 10 million with substantial numbers being active simultaneously, and each mobile subscriber may instantiate multiple protocol sessions at the same time, leading to severe processing constraints on traditional routers. Also, virtual appliances are likely third party provided and cannot partake in the session-routing protocol itself. Thus, there is a need to aggregate mobile traffic into individual sessions to third party provided virtual appliances in a scalable manner. Shallow-packet-techniques can be used to identify sessions and to map those sessions to virtual appliances. However, traditional routers are generally not capable of maintaining individualized session-routing information of typical mobile networks due to the sheer amount of information and associated signaling load.

Communication system 10 is configured to address these issues (and others) in offering a system and method for hierarchical load balancing in a network environment. Load-balancers (e.g., first stage load-balancer 20) in first stage 14 can mechanically forward packet 21 to one of second stage load-balancers 20(1)-20(N). Second stage load-balancers 20(1)-20(N) may perform shallow-packet-inspection to route sessions to servers 23(1)-23(M). Affinity (e.g., stickiness, persistence, etc.) may be maintained between load-balancers in first stage 14 and load-balancers in second stage 18 (e.g., substantially all packets belonging to a specific session may be forwarded from first stage load-balancer 16 to a specific second stage load-balancer 20(1)).

However, dynamic changes in second stage load-balancers 20(1)-20(N) may cause traffic to be routed to a random second stage load-balancer, e.g., 20(2). Embodiments of communication system 10 may provide mechanisms for efficiently sharing shallow-packet-routing information among second stage load-balancers 20(1)-20(N) to address such routing anomalies. In a specific example embodiment, first stage load-balancer 16 may comprise "traditional" routers (e.g., high performance edge router) with load-balancing capabilities, and second stage load-balancers 20(1)-20(N) may execute on regular processors as virtual network appliances (e.g., Intel® x-86 based), embedded in hypervisor kernels, or incorporated in other traditional routers. In a specific embodiment, a single physical "traditional" router may include functionalities of both first stage load-balancer 16 and one of second stage load-balancers 20(1)-20(M).

Hierarchical load balancing can solve certain issues of distributing high-bandwidth aggregate transfer of data from many narrow-band sources (e.g. mobile nodes) into individual streams to a specific server (e.g., server 23(1)) that can provide in-line services for the narrow-band sources on a session-by-session basis. Embodiments of communication system 10 can provide a hierarchical load-balancing scheme in two (or more) layers, where first stage 14 mechanically distributes load over a series of second stage load-balancers 20(1)-20(N) that manage individual sessions. First stage processing may be mostly stateless and fast, but likely not completely accurate given potential failures and reconfigurations, if any, of load balancers in second stage 18. Second stage load-balancers 20(1)-20(N) in second stage 18 may correct such "misrouted" sessions and route on a session-by-session basis to the individual in-line service appliance serving the session on the corresponding server (e.g., server 23(1)).

According to various embodiments, load-balancers (e.g., first stage load-balancer 16) in first stage 14 may distribute traffic (e.g., a plurality of packets 21) evenly over second stage load-balancers 20(1)-20(N) in second stage 18. In example embodiments, first stage load-balancer 16 may implement hash-based equal cost multi path (ECMP) techniques over mobile node 22's source address, or source address combined with protocol parameters (or other suitable hashing algorithm parameters), to determine appropriate second stage load-balancer 20(1). For example, a hash may be calculated over a part of the IP header; based on the outcome of the hash calculation, a specific second stage load-balancer (e.g., 20(1)) may be selected. The number of hash buckets over which ECMP load balances may be determined by a number N of second stage load-balancers 20(1)-20(N).

In some embodiments, second stage load-balancers 20(1)-20(N) may announce their presence in network 12 by any suitable protocol or mechanism, including border gateway protocol (BGP), Intermediate System to Intermediate System (IS-IS) protocol, Open Shortest Path First (OSPF) protocol. First stage load-balancers (e.g., first stage load-balancer 16) in first-stage 14 may split incoming traffic among second stage load-balancers 20(1)-20(N) using suitable techniques, such as splitting multicast ECMP traffic over multiple paths, or by I-BGP multipath load-sharing techniques, etc.

In some embodiments, first stage 14 may comprise a plurality of load-balancers, which may communicate (e.g., negotiate, synchronize, etc.) among themselves to identify the pool of second stage load-balancers 20(1)-20(N) in second stage 18. Substantially all first-stage load-balancers (e.g., first stage load-balancer 16) may distribute load (e.g., traffic) identically among substantially all second-stage load-balancers 20(1)-20(N). Second-stage load-balancers 20(1)-20(N) may signal their respective availability and/or reconfigurations to substantially all first-stage load-balancers by way of existing routing protocols.

When communication system 10 is at rest (e.g., when second-stage load-balancers 20(1)-20(N) do not experience re-configurations and substantially all first-stage load-balancers agree on the availability of second-stage load-balancers 20(1)-20(N)), substantially all first-stage load-balancers (e.g., first stage load-balancer 16) may load balance identically. For example, packet 21 with a source address IP1 may be almost always forwarded by any one of the first stage load-balancers to a specific second stage load-balancer (e.g., 20(1)). The specific second stage load-balancer (e.g., 20(1)), to which a specific session is load-balanced may be referred to as the "affinity load-balancer" for that session.

At times when communication system 10 may not be at rest (e.g., any one or more of second stage load-balancers 20(1)-20(N) may fail, networking connections between first stage 14 and second stage 18 may fail and/or new second stage load-balancers may be created), packet 21 for a specific session may be routed to any one of second stage load-balancers (e.g., 20(2)-20(N), assuming that the affinity load-balancer for the specific session was second stage load-balancer 20(1)) to which the specific session may not have any affinity. The second stage load-balancer (e.g., 20(2)), which receives packet 21, may lookup a session routing state to find appropriate server 23(1) to which to forward packet 21. The session routing state may comprise an association between a next hop for packet 21 and packet 21's 5-tuple representing a session to which the packet belongs. The 5-tuple can include source IP address, source port, destination IP address, destination port, and protocol. Other parameters, such as IP prefix, IP host address, or IP host address potentially extended with additional IP header fields, etc. and server IP address managing the session may be included in the session routing state. The second stage load-balancer (e.g., 20(2)) may work with a consistent copy of the data structure carrying the session routing state to make an appropriate session routing decision.

In some embodiments, the per-session routing scheme comprises retrieving the session routing state from DHT 24. Substantially all second stage load-balancers 20(1)-20(N) may share DHT 24. As used herein, the term "DHT" refers to a class of a decentralized distributed systems (e.g., a software system in which components located on networked computers communicate and coordinate their actions by passing messages, or using suitable connectors and other communication mechanisms) that provides a lookup service similar to a hash table; {key, value} pairs are stored in the DHT, and any participating node can retrieve the value associated with a given key. Responsibility for maintaining the mapping from keys to values is distributed among the nodes, so that a change in the set of participants causes a minimal amount of disruption, allowing the DHT to scale to extremely large numbers of nodes and to handle continual node arrivals, departures, and failures in an efficient manner. Substantially all 5-tuples representing the sessions processed in network 12 may be recorded in DHT 24.

Lampson's leases may be used to read from and write to the session-routing state. As used herein, the term "lease" indicates a time-based mechanism that provides consistent access to cached data in distributed systems, including DHT 24. The lease is a contract that gives the leaseholder specific privileges (e.g., read privileges, write privileges) over memory space (e.g., that stores session routing state in session table 48) for a limited (e.g., specified, predetermined) period of time. A read lease grants its holder permission to read the data in the memory space during the term of the lease; a write lease grants its holder permission to write to the memory space during the term of the lease.

A service implementing DHT 24 may provide lease functionality for data distribution and serialization of updates. When a 5-tuple in DHT 24 is in a "read" state, it can be shared across many second stage load-balancers 20(1)-20(N). Writing the 5-tuple, or updating it, may be performed with a "write lease." To generate a "write" lease to a 5-tuple, substantially all "read" leases for the 5-tuple may be revoked. As the "leases" have timeouts, it may be possible to break the lease when the timeout ends. In some embodiments, each second stage load-balancer 20(1) may include a portion of DHT 24. In other embodiments, DHT 24 may be provisioned in plurality of servers 23(1)-23(M) (or other servers) elsewhere in network 12 and each second stage load-balancer 20(1)-20(N) may query and/or otherwise access DHT 24 remotely.

If communication system 10 is at rest, the affinity load-balancer (e.g., second stage load-balancer 20(1)) may hold a read lease. The affinity load-balancer may route packet 21 to server 23(1) without interactions with any of the other second stage load-balancers 20(2)-20(N) in second stage 18 and DHT 24. The affinity load-balancer may periodically refresh the lease. If communication system 10 is not at rest, first stage load-balancer 16 may forward packet 21 to second stage load-balancer 20(2) that is not the affinity load-balancer. Second stage load-balancer 20(2) may obtain a read lease to the relevant 5-tuple in DHT 24, and load the 5-tuple into its local cache to make the routing decision. In case server 23(1) relocates, or when a session is moved to another server 23(M), a management function (e.g., management application, controller application, provisioning process, etc.) can obtain a write lease to the 5-tuple, before updating the 5-tuple with the new routing information.

In some embodiments, the affinity load-balancer identity (e.g., IP address, network name, etc.) may be included in the 5-tuple; updates to the session routing state may be enforced through the affinity load-balancer (e.g., affinity load-balancer requests write lease, and updates 5-tuple). In some embodiments, when a second level load balancer receives a "misrouted" packet, it could decide to forward the packet to the affinity load balancer as stated in DHT 24, instead of routing it itself to the appropriate server.

In embodiments where a traditional router executing first stage load-balancer 16 also includes second-stage load balancing capabilities, it can obtain a read lease in lieu of, or in addition to, other second stage load-balancers 20(1)-20(N). Such traditional routers can further optimize access to server 23(1) for certain high-performance service appliances and avoid other second stage load-balancers 20(1)-20(N) in such embodiments.

According to various embodiments wherein DHT 24 may be implemented in substantially all second stage load balancers 20(1)-20(N), appropriate scalability may be achieved. When system demand increases (e.g., communication system 10 is processing more packets 21), the management function that allocates resources may add more second level load balancers, each configured to host DHT 24. The capacity of DHT 24 may be proportionately increased with the increased number of second stage load balancers.

In some embodiments per-session routing may be implemented by replicating the session routing state across substantially all second stage load-balancers 20(1)-20(N). Interested second stage load-balancers 20(1)-20(N) can announce their respective interest in updates to the session routing space. When an application session is committed to a specific server 23(1), second stage load-balancer 20(1) that processed the session may announce the forwarding state to substantially all other second stage load-balancers 20(2)-20(N) interested in the update. Reliable multicast mechanisms may be implemented for the update, for example, when server 23(1) relocates (e.g., changes its IP address), a new 5-tuple is created, or when the 5-tuple is discarded. A suitable management function (e.g., executing in a central management service, or in the relevant second stage load-balancer 20(1)) can announce the update to substantially all second stage load-balancers interested in the update. Such distribution mechanisms may be useful in embodiments where there is a churn in second stage load-balancers 20(1)-20(N). When a new second stage load-balancer 20(N+1) starts (or is otherwise attached to network 12), it may become a member of a reliable multicast group and may download the session table from one of other second stage load-balancers 20(1)-20(N).

In some embodiments, BGP or other routing protocols can be used to manage the distributed session routing state. For example, the routing protocols can be adapted to carry the 5-tuple in reachability information, for example, in a custom field. In one example, BGP may be modified to carry source prefixes and other header fields combined with server addresses (i.e., next hop addresses) in their advertisements instead of the destination address and next hop information. By limiting the distribution of such information to second stage load-balancers 20(1)-20(N), potentially by using outbound-route filtering (ORF) techniques (e.g., according to RFC5291), 5-tuple-space advertisement traffic can be limited.

Note that although the example embodiments described herein include two levels of hierarchical load balancing, any suitable plurality of levels of load-balancers may be used within the broad scope of the embodiments of communication system 10. Embodiments of communication system 10 provides a method for load balancing traffic from a high-bandwidth aggregate stream of many independent sessions down to individual sessions managed through servers 23(1)-23(M). The load balancing methods may also be used in applications serving non-mobile networks.

Turning to the infrastructure of communication system 10, the network topology can include any number of servers, load-balancers, switches (including distributed virtual switches), routers, and other nodes inter-connected to form a large and complex network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The network topology illustrated in FIG. 1 is simplified for ease of illustration, and may include any suitable topology, including tree, ring, star, bus, etc. in various embodiments. For example, the network may comprise Transparent Interconnection of Lots of Links (TRILL) network, access/edge/core network, etc. The example network environment may be configured over a physical infrastructure that may include one or more networks and, further, may be configured in any form including, but not limited to, LANs, wireless local area networks (WLANs), VLANs, metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In some embodiments, load-balancers 16 and 20(1)-20(N) can include load balancing software applications executing in one or more routers or switches in network 12. In other embodiments, load-balancers 16 and 20(1)-20(N) can include dedicated hardware service appliances dedicated to performing load balancing and connected to one or more routers or switches in network 12. In yet other embodiments, load-balancers 16 and 20(1)-20(N) can include a suitable combination of hardware and software modules executing in an appropriate network element in network 12. The load-balancers are simple network elements that can include computers, network appliances, servers, routers, switches, gateways, bridges, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Embodiments of communication system 10 provide a method for hierarchical application-specific session load balancing comprising at least two stages of load-balancers, wherein first stage 14 uses simple hash-based load-balancing techniques, and second stage 18 maintains per-session routing state. To maintain consistency in second stage 18 despite failures, unavailability of resources, or dynamically added application-specific session routers, at least two techniques (e.g., DHT and replicated session routing states) are provided to maintain distributed routing state.

In various embodiments, first stage 14 can address the raw bandwidth requirements of service delivery, and second stage 18, operating on regular processors, for example, can be used for maintaining the (potentially) voluminous amount of session-routing state. If first stage 14 had to provide session-routing state, the forwarding capacity of first stage 14 would be underutilized, especially in a mobile network environment. Assuming that second stage load-balancers 20(1)-20(N) can correct any misrouted packet to the appropriate one of servers 23(1)-23(M), there may be no need for first stage load-balancers (e.g., 20) to track session stickiness.

Figure 2:
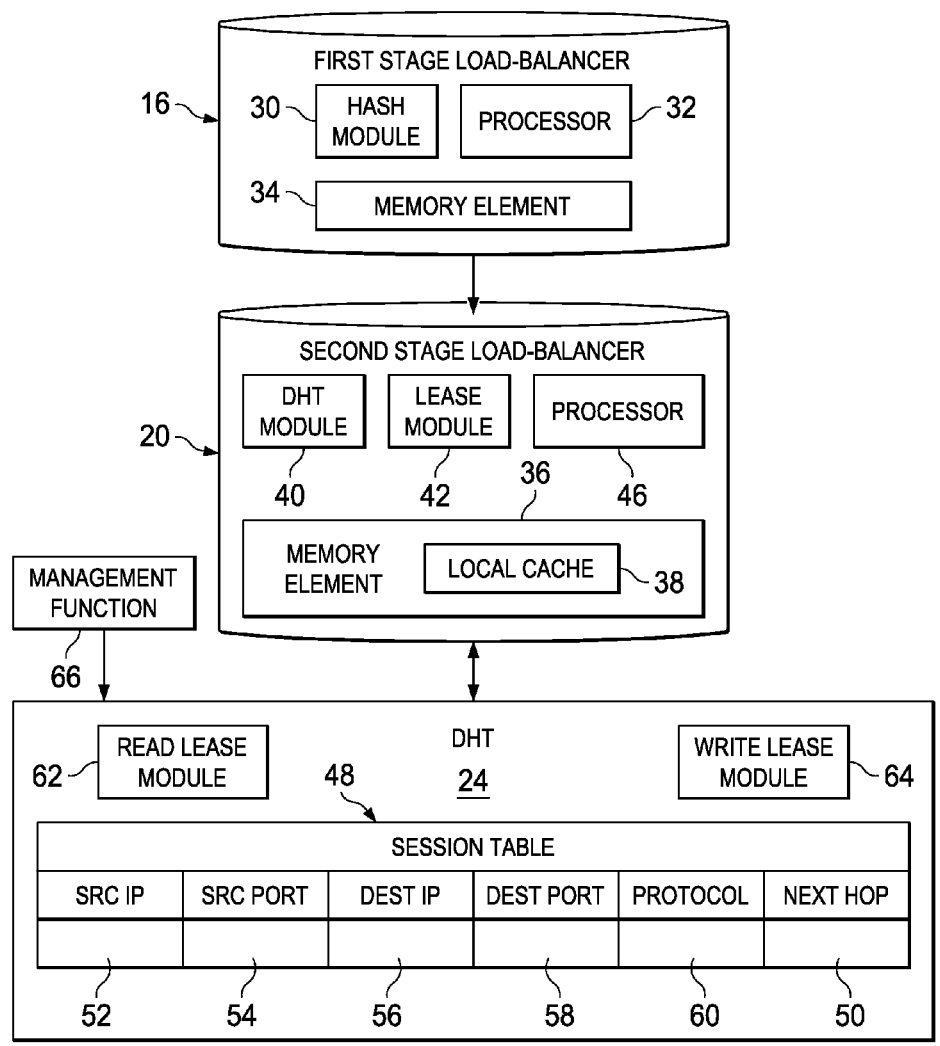
FIG. 2 is a simplified block diagram illustrating example details of the communication system in accordance with one embodiment.

Turning to FIG. 2, FIG. 2 is a simplified block diagram illustrating example details of an embodiment of communication system 10. Example first stage load-balancer 16 can include a hash module 30, a processor 32, and a memory element 34. When a packet (e.g., packet 21) is received at first stage load-balancer 16, hash module 30 may compute a hash on certain packet parameters to determine the second stage load-balancer to which to forward the packet. Hash module 30 may execute any suitable hash algorithm, including ECMP.

Example second stage load-balancer 20 can include a memory element 36, including a local cache 38, a DHT module 40, a lease module 42, and a processor 46. When the packet is received at second stage load-balancer 20 from first stage load-balancer 16, a lookup in local cache 38 may be performed to seek a next hop for the packet. If the packet's session routing state is unavailable in local cache 38, so that the next hop cannot be determined from local cache 38, DHT module 40 may query DHT 24 and lease module 42 may request a lease to the packet's session routing state in DHT 24.

Example DHT 24 may include a session table 48, comprising session routing state that maps a packet's next hop 50 with a 5-tuple, for example, including source IP address 52, source port 54, destination IP address 56, destination port 58, and protocol 60. A read lease module 62 may manage read leases to the session routing state in session table 48. A write lease module 64 may manage write leases to the session routing state in session table 48.

If the session routing state of the packet is present in session table 48, read lease module 62 may generate a read lease to second state load-balancer 20 and change the state of the appropriate session routing state to a "read state." When the memory space corresponding to the session routing state of the packet is subject to one or more read leases (and is in a read state), the information in the memory space may be read by the read leaseholders. More than one second stage load-balancer 20 may hold a read lease within the broad scope of the embodiments. In various embodiments, read lease module 62 may record the identity(ies) of the requestor(s) of the read lease(es) and the respective read lease.

A management function 66 (e.g., a controller process, virtual switch management procedure, etc.) may request a write lease to update the session routing state, for example, when there is a change in the network configuration (e.g., server 23(1) moves, next hop changes, etc.). Write lease module 64 in DHT 24 may receive the write lease request, revoke the read leases to the memory space, and generate a write lease for management function 66. When the read leases are revoked, the data in the memory space corresponding to the revoked read leases are invalidated. After management function 66 updates the memory space of session table 48 with the appropriate update, second stage load-balancer 20 can request a new read lease to the memory space, and retrieve the updated session routing state from session table 48.

In some embodiments, management function 66 may execute in a management application or server remote from second stage load-balancer 20. In other embodiments, second stage load-balancer 20 may include management function 66. Moreover, DHT 24 may be provisioned in a plurality of nodes in network 12. In one example embodiment, DHT 24 may be provisioned in plurality of servers 23(1)-23(M), with each server 23(1) . . . 23(M) including a partial non-overlapping portion of DHT 24. In another example embodiment, DHT 24 may be provisioned in plurality of second stage load-balancers 20(1)-20(N), with each second stage load-balancer 20(1) . . . 20(N) including a partial non-overlapping portion of DHT 24. DHT 24 may be maintained by any suitable mechanism appropriate for distributed systems. Note also that session table 48 may be saved (e.g., stored) in any suitable format, including table, database, data structure, cell, or array without departing from the broad scope of the embodiments.

Figures 3, 4:
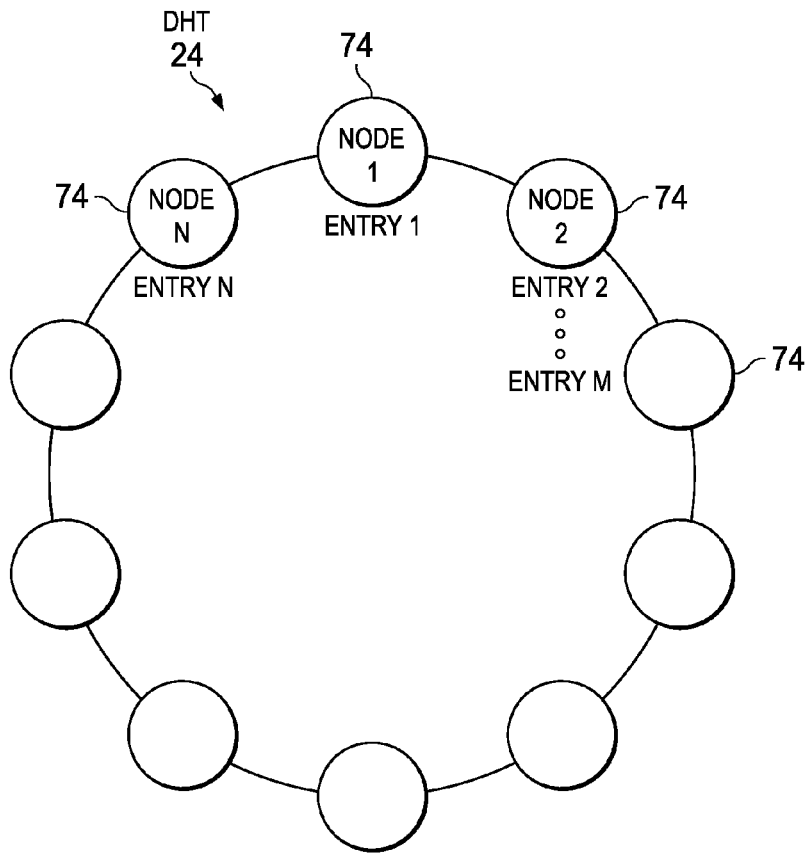
FIG. 3 is a simplified block diagram illustrating other example details of the communication system in accordance with one embodiment.
FIG. 4 is a simplified block diagram illustrating yet other example details of the communication system in accordance with one embodiment.

Turning to FIG. 3, FIG. 3 is a simplified block diagram illustrating example details of example session table 48 according to an embodiment of communication system 10. Session table 48 may include, in addition to next hop 50, source IP address 52, source port 54, destination IP address 56, destination port 58, and protocol 60, an identifier of the affinity load-balancer 68. In embodiments where the affinity load-balancer 68 is included in session table 48, updates to session table 48 may be managed by appropriate management function 66 at the affinity load-balancer.

Turning to FIG. 4, FIG. 4 is a simplified diagram illustrating example details of example DHT 24 according to an embodiment of communication system 10. A portion (e.g., each) entry in session table 48 may be stored in a separate node 74 in network 12. For example, entry 1 may be stored in node 1; entries 2 to M may be stored in node 2; entry N may be stored in node N; and so on. Each node 74 managing the respective entry(ies) may issue read and write leases as appropriate in some embodiments. In other embodiments, a centralized control node may manage entries in nodes 74 and may issue read and write leases as appropriate. Any suitable configuration of DHT 24, where session table 48 is stored in a plurality of nodes in network 12 may be included within the broad scope of the embodiments.

Figure 5:
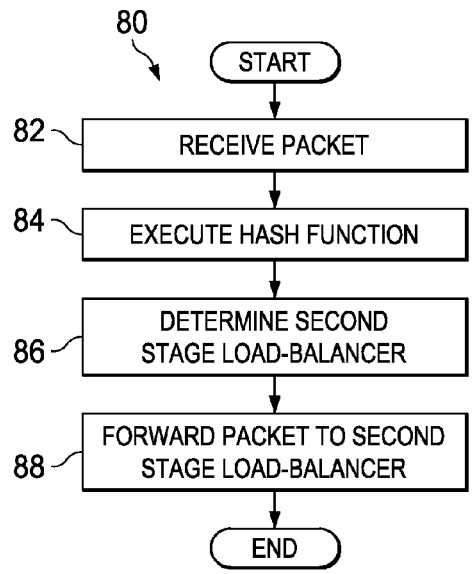
FIG. 5 is a simplified flow diagram illustrating potential example operations that may be associated with an embodiment of the communication system.

Turning to FIG. 5, FIG. 5 is a simplified flow diagram illustrating example operations 80 that may be associated with first stage load-balancer 16 according to an embodiment of communication system 10. At 82, packet 21 may be received from mobile node 22. At 84, first stage load-balancer 16 may execute a hash function, for example, ECMP, over certain header fields of packet 21. At 86, based on the results of the hash function, suitable second stage load-balancer 20 may be determined. At 88, packet 21 may be forwarded to second stage load-balancer 20.

Figure 6:
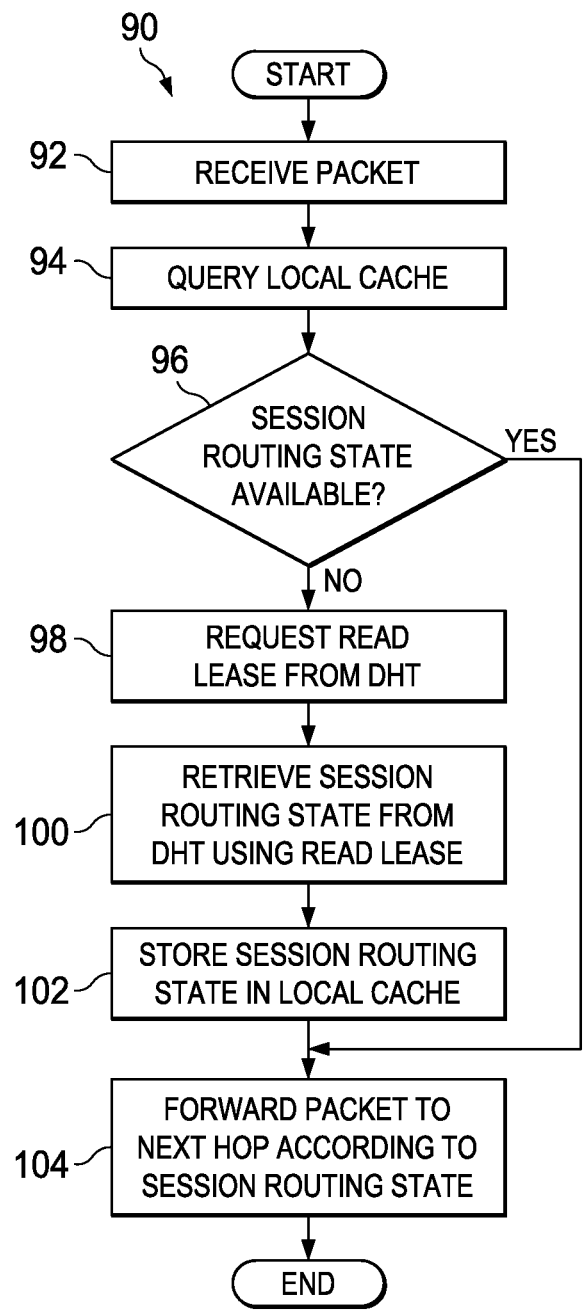
FIG. 6 is a simplified flow diagram illustrating other example operations that may be associated with an embodiment of the communication system.

Turning to FIG. 6, FIG. 6 is a simplified flow diagram illustrating example operations 90 that may be associated with second stage load-balancer 20 according to an embodiment of communication system 10. At 92, packet 21 may be received from first stage load-balancer 16. At 94, local cache 38 may be queried to determine a next hop. At 96, a determination may be made whether session routing state is available in local cache 38. If the session routing state is not available, at 98, lease module 42 may request a read lease from DHT 24. At 100, the session routing state may be retrieved from DHT 24 by DHT module 40 using the read lease. At 102, the retrieved session routing state may be stored in local cache 38. At 104, packet 21 may be forwarded to the next hop according to the session routing state. Turning back to 96, if the session routing state is available in the next hop, the operations may step to 104, and packet 21 may be forwarded to the next hop according to the session routing state.

Figure 7:
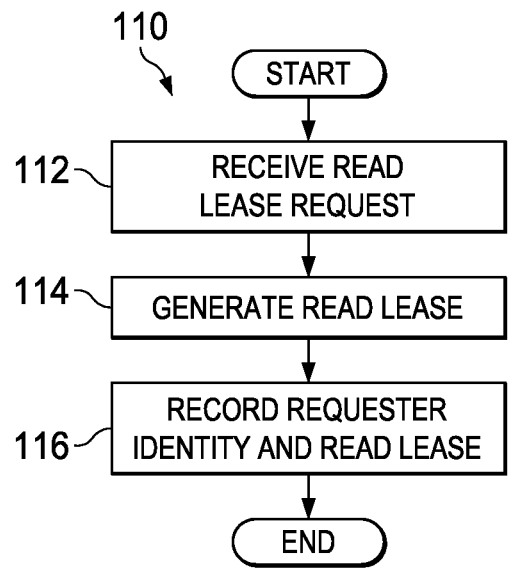
FIG. 7 is a simplified flow diagram illustrating yet other example operations that may be associated with an embodiment of the communication system.

Turning to FIG. 7, FIG. 7 is a simplified flow diagram illustrating example operations 110 that may be associated with a service managing DHT 24 according to an embodiment of communication system 10. At 112, a read lease request may be received from second stage load-balancer 20 to memory space corresponding to a specific session routing state. At 114, a read lease may be generated. At 116, the requestor identity and read lease may be recorded suitably.

Figure 8:
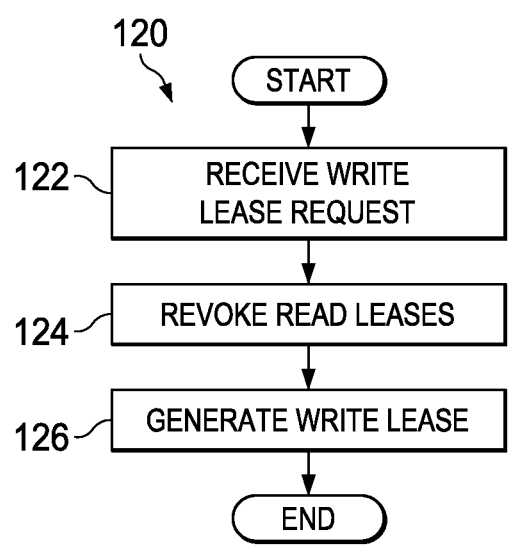
FIG. 8 is a simplified flow diagram illustrating yet other example operations that may be associated with an embodiment of the communication system.

Turning to FIG. 8, FIG. 8 is a simplified flow diagram illustrating example operations 120 that may be associated with a service managing DHT 24 according to an embodiment of communication system 10. At 122, a request for a write lease may be received from management function 66 to memory space for a specific session routing state. At 124, all read leases to the memory space may be revoked. At 126, the write lease may be generated.

Figure 9:
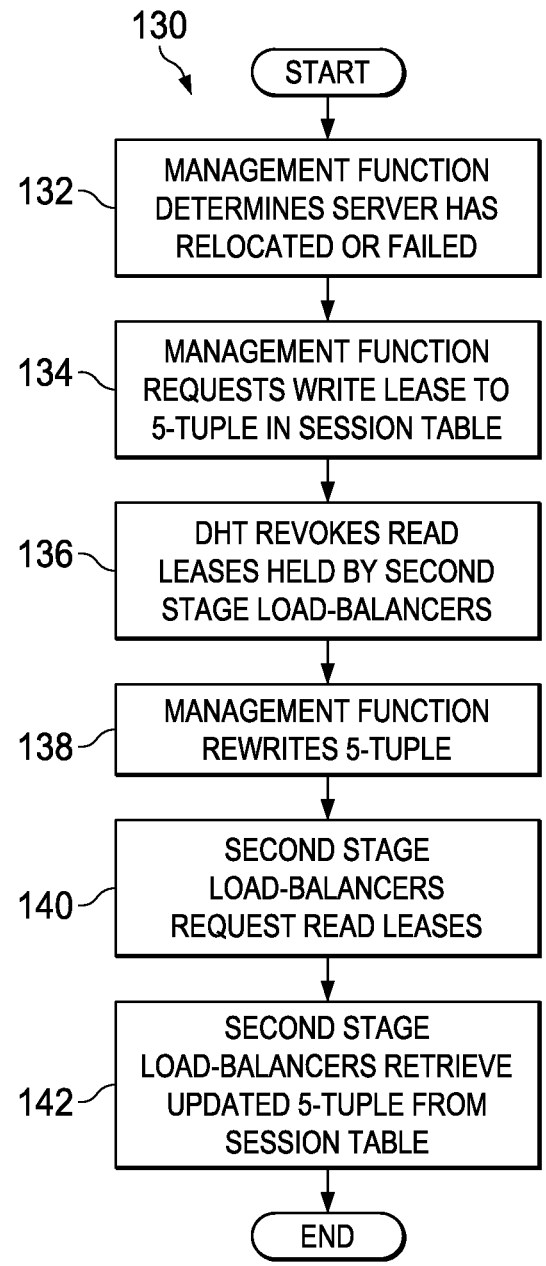
FIG. 9 is a simplified flow diagram illustrating yet other example operations that may be associated with an embodiment of the communication system.

Turning to FIG. 9, FIG. 9 is a simplified flow diagram illustrating example operations 130 that may be associated with an embodiment of communication system 10. At 92, management function 66 may determine that server 23(1) has relocated or failed, or otherwise reconfigured in network 12 so that its corresponding session routing state in session table 48 is not current. At 134, management function 66 may request a write lease to relevant 5-tuple in session table 48. At 136, DHT 24 may revoke read licenses to the 5-tuple that are held by one or more of second stage load-balancers 20(1)-20(N). At 138, management function 66 may rewrite the 5-tuple in session table 48 appropriately to reflect the change associated with server 23(1) and/or the corresponding session routing state. At 140, the one or more second stage load-balancers 20(1)-20(N) may request read leases to the 5-tuple. At 142, the one or more second stage load-balancers 20(1)-20(N) may retrieve the updated 5-tuple from session table 48.

Figure 10:
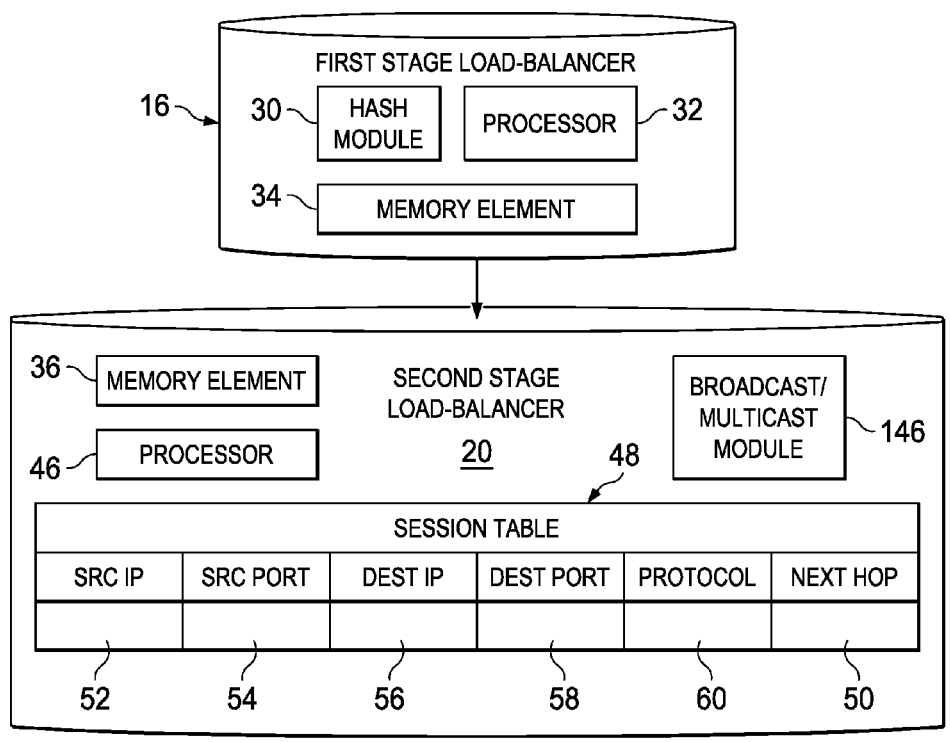
FIG. 10 is a simplified block diagram illustrating yet other example details of the communication system in accordance with one embodiment.

Turning to FIG. 10, FIG. 10 is a simplified block diagram illustrating another example embodiment of communication system 10. Example first stage load-balancer 16 can include hash module 30, processor 32, and memory element 34. When a packet (e.g., packet 21) is received at first stage load-balancer 16, hash module 30 may compute a hash on certain packet parameters to determine the second stage load-balancer to which to forward the packet. Hash module 30 may execute any suitable hash algorithm, including ECMP.

Example second stage load-balancer 20 can include memory element 36, processor 46, a local copy of session table 48 and a broadcast/multicast module 146. Note that substantially all second stage load-balancers in network 12 may have a replicated local copy of session table 48. Session table 48 may include appropriate fields 50-60 for next hop, source IP address, source port, destination IP address, destination port, and protocol, respectively. When the packet is received at second stage load-balancer 20 from first stage load-balancer 16, session table 48 may be looked up. If the session routing state information is not present therein, a new entry may be entered, for example, by assigning an appropriate one of servers 23(1)-23(M) according to suitable load balancing algorithms. Broadcast/multicast module 146 may advertise the update to substantially all other second stage load-balancers 20 in network 12 that are interested in receiving the update. The advertisement may be communicated in any suitable protocol, including BGP, I-BGP, etc. The packet may be forwarded to the selected server according to the session routing state information in session table 48.

Figure 11:
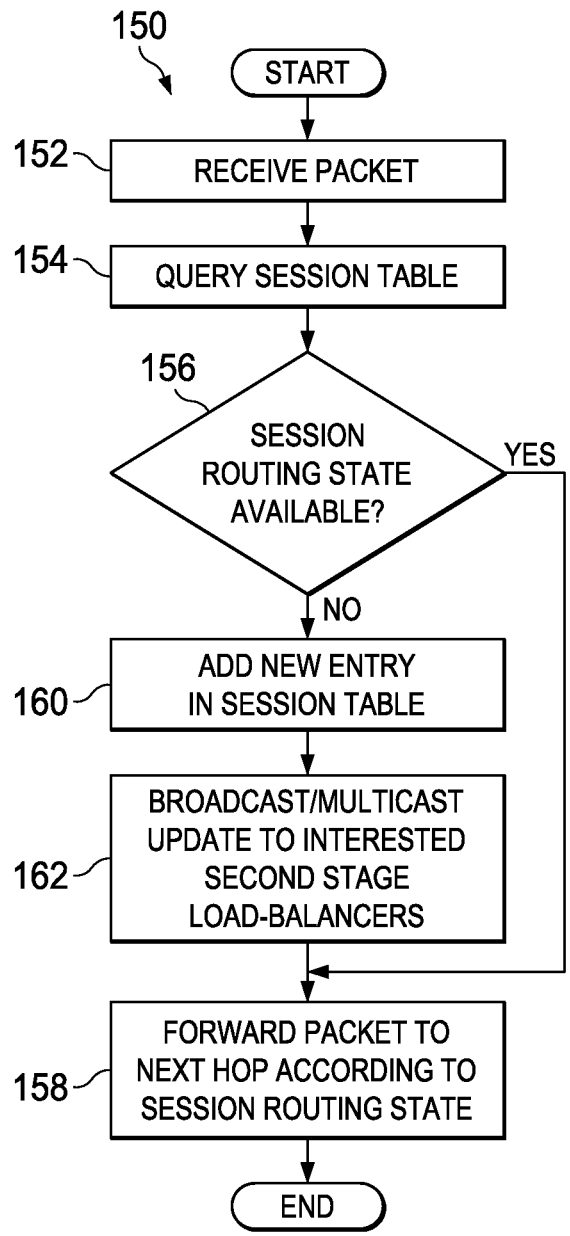
FIG. 11 is a simplified flow diagram illustrating potential example operations that may be associated with an embodiment of the communication system.

Turning to FIG. 11, FIG. 11 is a simplified flow diagram illustrating example operations 150 that may be associated with an embodiment of communication system 10. At 152, packet 21 may be received at second stage load-balancer 20. At 154, session table 48 may be queried for the relevant session routing state. At 156 a determination may be made whether the session routing state is available in the local copy of session table 48. If available, at 158, the packet may be forwarded to the next hop according to the session routing state. If not available, at 160, a new entry may be added in session table 48. At 162, the update may be broadcast or multicast to interested second stage load-balancers in network 12. The operations may step to 158, and the packet may be forwarded to the next hop according to the session routing state as reflected in the new entry.

Figure 12:
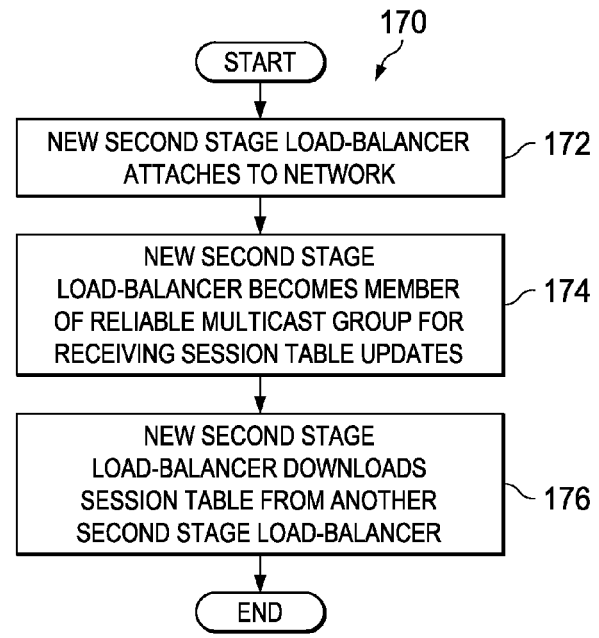
FIG. 12 is a simplified flow diagram illustrating potential example operations that may be associated with an embodiment of the communication system.

Turning to FIG. 12, FIG. 12 is a simplified flow diagram illustrating example operations 170 that may be associated with an embodiment of communication system 10. At 172, a new second stage load balancer 20(N+1) may attach to network 12. At 174, new second stage load balancer 20(N+1) may become a member of a reliable multicast group for receiving session table updates. At 176, new second stage load balancer 20(N+1) may download a copy of session table 48 from another second stage load balancer (e.g., 20(1)-20(N)) in network 12.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of any executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, load-balancers (e.g., first stage load-balancer 16 and second stage load-balancers 20(1)-20(N)). In some embodiments, one or more of these features may be implemented in hardware, provided external to these elements, or consolidated in any appropriate manner to achieve the intended functionality. The various network elements (e.g., servers, switches) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, load-balancers (e.g., first stage load-balancer 16 and second stage load-balancers 20(1)-20(N)) described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 34, 36) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processors 32, 46) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:
1. A method, comprising:
receiving a packet at one of a plurality of second stage load-balancers in a network, wherein the packet is forwarded from a first stage load-balancer to the second stage load balancer according to a hash based forwarding scheme; and routing the packet, by the second stage load-balancer to one of a plurality of servers in the network according to a per-session routing scheme that comprises, at least, retrieving a session routing state from a distributed hash table (DHT) in the network, wherein the DHT is distributed among the plurality of second stage load-balancers, wherein the session routing states are maintained in the DHT using leases, wherein the session routing state comprises a data structure including a next hop for the packet associated with a session to which the packet belongs.

2. The method of claim 1, wherein the hash based forwarding scheme comprises equal cost multipath (ECMP) routing, and wherein ECMP comprises calculating a hash over parameters in the packet's header to determine the second stage load-balancer.

3. The method of claim 1, wherein the per-session routing scheme further comprises:
querying a local cache for the session routing state at the second stage load-balancer;
requesting a read lease from the DHT for the session routing state, wherein the session routing state in a read state can be shared across more than one second stage load-balancer;
retrieving the session routing state from the DHT using the read lease; and
forwarding the packet to the next hop according to the session routing state.

4. The method of claim 3, wherein the DHT generates the read lease and records a requestor's identity.

5. The method of claim 1, wherein updates to the DHT are performed using a write lease to the session routing state, wherein the DHT revokes read leases and generates the write lease.

6. The method of claim 1, wherein the session routing state comprises an association between a next hop for the packet and the packet's 5-tuple representing a session to which the packet belongs.

7. The method of claim 6, wherein the 5-tuple comprises a source Internet Protocol (IP) address, a source port, a destination IP address, a destination port and a protocol.

8. The method of claim 7, wherein the 5-tuple further comprises an affinity second stage load-balancer, wherein the session is load balanced to the affinity second stage load-balancer when a load balancing system of the network is at rest.

9. The method of claim 1, wherein the DHT is further distributed across a plurality of servers in the network with each server including a partial portion of the DHT.

10. The method of claim 1, wherein each second stage load-balancer includes a partial portion of the DHT.

11. One or more non-transitory tangible media encoding logic that includes instructions for execution, which when executed by a processor, is operable to perform operations comprising:
receiving a packet at one of a plurality of second stage load-balancers in a network, wherein the packet is forwarded from a first stage load-balancer to the second stage load balancer according to a hash based forwarding scheme; and
routing the packet, by the second stage load-balancer to one of a plurality of servers in the network according to a per-session routing scheme, comprising retrieving a session routing state from a distributed hash table (DHT) in the network, wherein the DHT is distributed among the plurality of second stage load-balancers, wherein the session routing states are maintained in the DHT using leases, wherein the session routing state comprises a data structure including a next hop for the packet associated with a session to which the packet belongs.

12. The media of claim 11, wherein the hash based forwarding scheme comprises ECMP routing, wherein ECMP comprises calculating a hash over parameters in the packet's header to determine the second stage load-balancer.

13. The media of claim 11, wherein the per-session routing scheme further comprises:
querying a local cache for the session routing state at the second stage load-balancer;
requesting a read lease from the DHT for the session routing state, wherein the session routing state in a read state can be shared across more than one second stage load-balancer;
retrieving the session routing state from the DHT using the read lease; and
forwarding the packet to the next hop according to the session routing state.

14. The media of claim 11, wherein updates to the DHT are performed using a write lease, wherein the DHT revokes read leases and generates the write lease.

15. The media of claim 11, wherein the session routing state comprises an association between a next hop for the packet and the packet's 5-tuple representing a session to which the packet belongs.

16. An apparatus, comprising:
a DHT module comprising a portion of a DHT;
a memory element for storing data; and
a processor that executes instructions associated with the data, wherein the processor and the memory element cooperate such that the apparatus is configured as one of a plurality of second-stage load balancers for:
receiving a packet, wherein the packet is forwarded from a first stage load-balancer to the second stage load balancer according to a hash based forwarding scheme; and
routing the packet, by the second stage load-balancer to one of a plurality of servers in the network according to a per-session routing scheme, comprising retrieving a session routing state from the DHT, wherein the DHT is distributed among the plurality of second stage load-balancers, wherein the session routing states are maintained in the DHT using leases, wherein the session routing state comprises a data structure including a next hop for the packet associated with a session to which the packet belongs.

17. The apparatus of claim 16, wherein the hash based forwarding scheme comprises ECMP routing, wherein ECMP comprises calculating a hash over parameters in the packet's header to determine the second stage load-balancer.

18. The apparatus of claim 16, wherein the per-session routing scheme further comprises:
querying a local cache for the session routing state at the second stage load-balancer;
requesting a read lease from the DHT for the 5-tuple, wherein the 5-tuple in a read state can be shared across more than one second stage load-balancer;
retrieving the session routing state from the DHT using the read lease; and
forwarding the packet to the next hop according to the session routing state.

19. The apparatus of claim 16, wherein updates to a distributed hash table (DHT) are performed using a write lease, wherein the DHT revokes read leases and generates the write lease.

20. The apparatus of claim 16, wherein the retrieving includes retrieving the session routing state from a distributed hash table (DHT) in the network, and wherein the DHT is distributed across a plurality of second stage load-balancers in the network with each second stage load-balancer including a partial portion of the DHT.

\* \* \* \* \*